June 22, 1965    P. J. V. NEGRÉ    3,190,071
IGNITER DEVICE INTENDED IN PARTICULAR FOR JET ENGINES
Filed Oct. 8, 1962    2 Sheets-Sheet 1
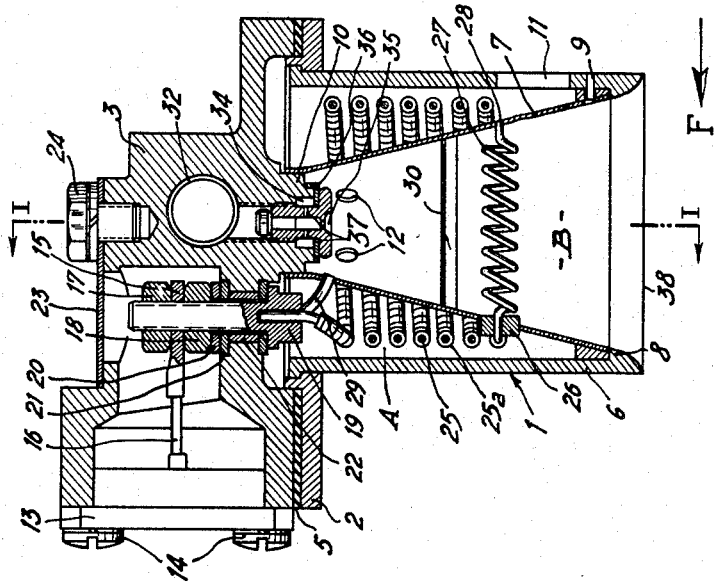
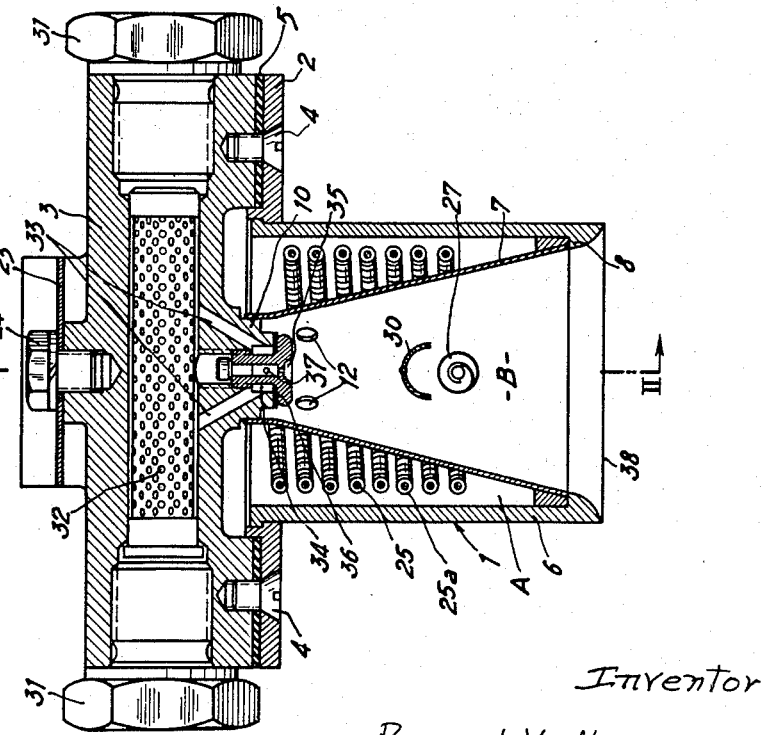
Inventor
Pierre J. V. Negré
By Stevens, Davis, Miller & Mosher
Attorneys

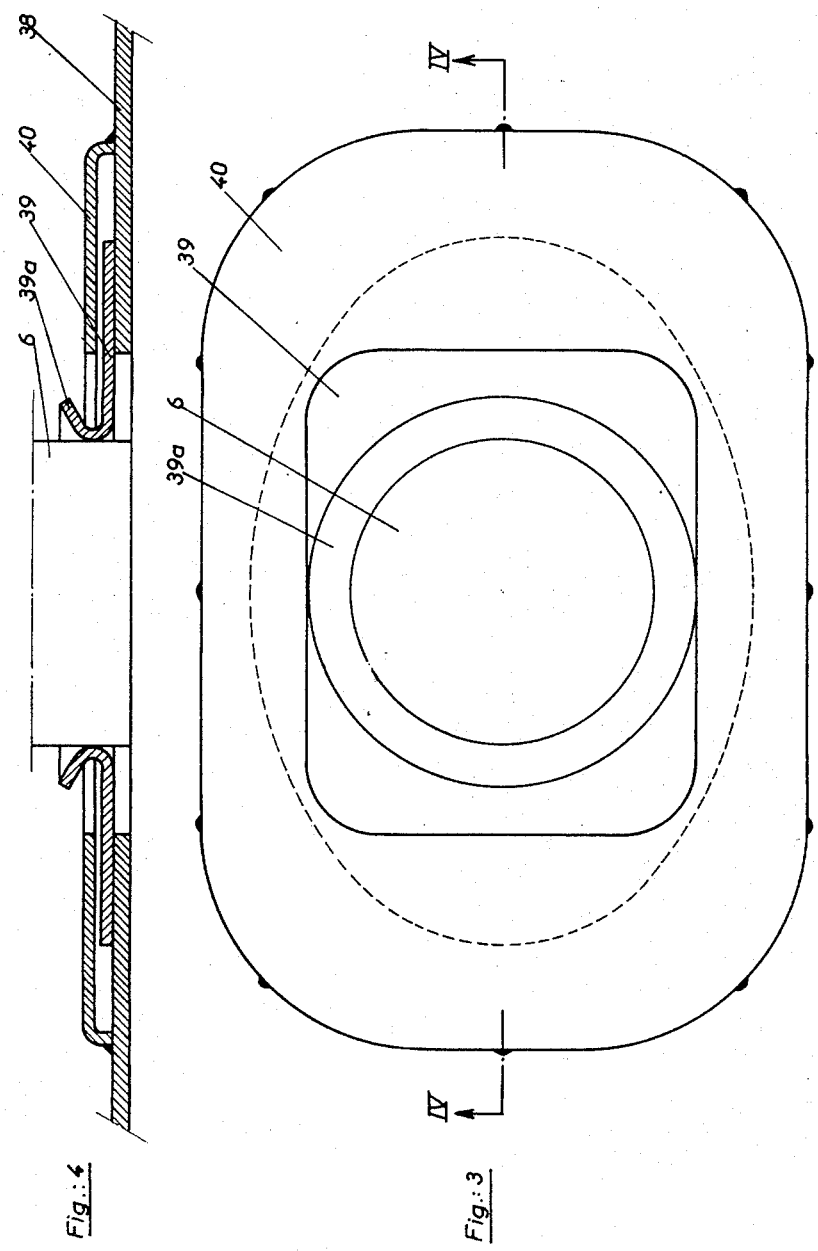

United States Patent Office 3,190,071
Patented June 22, 1965

3,190,071
IGNITER DEVICE INTENDED IN PARTICULAR FOR JET ENGINES
Pierre Jean Victor Negré, Paris, France, assignor to Société Nationale d'Étude et de Construction de Moteurs d'Aviation, Paris, France, a company of France
Filed Oct. 8, 1962, Ser. No. 229,070
Claims priority, application France, Oct. 11, 1961, 875,658
3 Claims. (Cl. 60—39.82)

This invention relates to igniter devices intended in particular for jet engines.

Devices for the ignition and re-ignition at altitude of jet engines have already been proposed which are constituted by an auxiliary combustion chamber opening into the main combustion chamber of the jet engine and receiving, on the one hand, air heated by an electrical resistance before it is introduced into the auxiliary combustion chamber and fuel on the other hand, the carburetted mixture passing over an incandescent electrical resistance which ensures the ignition thereof. The flame thus formed penetrates transversely into the main combustion chamber, in the wake of a burner.

Such ignition devices have formed the subject-matter more especially of British Patent No. 791,990 and No. 869,652.

The present invention is concerned with improvements in ignition devices of the foregoing character with the aim of improving behaviour and operation.

The essential characteristics of the improved igniter device according to the invention are the relative arrangement of the passages for the heated air and the carburetted mixture and also the internal arrangement of the parts. Thus the chamber containing the air-heating resistance is of annular form and surrounds the auxiliary combustion chamber, from which it is separated by a partition of substantially conical form which is perforated close to its smaller end so as to provide communication between the two chambers, the admission of air into the said annular chamber occurring near the larger end of the substantially conical partition, as does the exit of the incandescent mixture from the auxiliary combustion chamber.

As a result of this special arrangement the flow of heated air and the flow of carburetted mixture take place in opposite directions and moreover each of these flows passes through a conduit of increasing cross-section and thereby undergoes deceleration which assists ignition.

The air inlet in the annular chamber is preferably directed towards the upstream end of the jet engine so as to take advantage of the energy of the air flowing through the latter. The air entering the said chamber is advantageously secondary air.

The following description with reference to the accompanying drawings is given by way of non-limitative example and will make it clearly understood how the invention may be carried into effect. In the drawings:

FIGURES 1 and 2 are diagrammatic axial sections of a constructional embodiment of the invention, the section of FIGURE 1 being taken on the line I—I of FIGURE 2 and that of FIGURE 2 on the line II—II of FIGURE 1, FIGURE 3 is a plan view on a larger scale showing a constructional detail, and FIGURE 4 is a section on the line IV—IV of FIGURE 3.

The constructional form of the invention illustrated in the drawings comprises an ignition device 1 brazed on to a mounting flange 2 to which a head 3 for supplying electric current and fuel is fixed by means of screws 4, a gasket 5 being interposed therebetween.

The ignition device proper consists of a cylindrical skirt 6 and a thin frusto-conical partition 7 mounted inside the skirt coaxially therewith. This frusto-conical partition 7 rests at its base on an internal shoulder 8 of the skirt 6, a pin 9 fixing and determining the relative position of the two parts 6 and 7. The frusto-conical partition 7 is centred by means of a boss 10 integral with the supply head 3.

In the lower part of the skirt 6 a calibrated cold air inlet orifice 11 is formed, warm air inlet orifices 12 being formed in the upper portion of the frusto-conical partition 7. The air inlet 11 is directed towards the upstream end of the jet engine, the direction of flow of the air in the engine being indicated by the arrow F.

A current connector 13 is fixed by means of screws 14 to the supply head 3. Each eye terminal 15 of the two wires 16 of this connector is held by the locking action of two nuts 17 and 18 on respective terminals 19 fixed in the head 3. The electrical insulation of these terminals and the sealing of the combustion chamber at the points where they extend through the sealing surface are ensured by washers 20 and 21 and a bushing 22, for example of "Teflon." An inspection plate 23 held by a screw 24 permits access to these terminals.

From one of the terminals 19 a heating wire 25 extends, such heating wire being sheathed by insulating tubular elements 25a curved to follow the curvature of the wire which is coiled inside the annular chamber A defined by the skirt 6 and the frusto-conical partition 7. Owing to the curvature of the insulating elements 25a they cannot turn around the wire 25 under the influence of vibration. Thus, wear of the wire by friction is avoided. On the drawing the insulating elements 25a appear relatively short but they are shown in perspective views in which the diameters of the elements appear unaltered whereas their axial lengths, which are at considerable angles to the planes of FIGURES 1 and 2, appear considerably shortened. Moreover, these figures are only diagrammatic.

The wire 25 extends through the frusto-conical partition 7 through the medium of an insulating bead 26 sealed into a hole in the partition. The wire is then left bare and is coiled to form turns 27 which extend across the frusto-conical chamber B defined by the partition 7. The end 28 of the wire is brazed, for example with silver, to the diametrically opposite point of the chamber B. This end 28 is located opposite the air inlet 11 and this assists the cooling of the brazed joint.

At the other terminal (not shown) of the heating wire 25 there terminates a ground wire 29 brazed to the frusto-conical partition 7. The return of the current is thus ensured by this wire 29 and the earth of the frusto-conical partition 7.

A flame holder 30 in the form of an inverted U-shaped gutter is fixed to the frusto-conical partition 7 in front of the turns 27.

The supply head 3 is equipped with two fuel inlet couplings 31, 31, a filter 32 and ducts 33 conveying fuel to a manifold 34 communicating with a spray nozzle 35 through orifices 37. This nozzle is screwed into the boss 10, a lock washer 36 being interposed therebetween.

When being fitted, the device is placed in a cavity provided for this purpose in the combustion chamber of the jet engine. An external boss permits the fixing of the flange 2 by means of screws, after a gasket (not shown) has been interposed therebetween.

The through hole in the wall of the mixer is of such dimensions that the ignition device does not prevent the relative movements of the mixer due to expansion.

In order to prevent leakages, a plate 39, FIGURES 3 and 4, having in the centre a hole provided with a collar 39a and fitted to the skirt 6 can slide in four grooves formed by tongues 40 fixed, for example, by welding to the mixer with sufficient clearance not to prevent longitudinal, transverse and even radial movements of the mixer with respect to the igniter device.

The connector 13 is connected to the output of the electric current regulator usually provided on jet engines and one or other of the couplings 31 is connected to the fuel pipe. Depending on the side of the engine on which the device is mounted, that coupling 31 which is suitable is utilised, the other coupling being closed. It is obviously also possible to effect a double supply of fuel.

The igniter device hereinbefore described operates in the following maner:

The secondary air of the combustion chamber of the jet engine, flowing in the direction of the arrow F, passes through the orifice 11 into the first widening chamber A where it is decelerated by reason of the increasing cross-section of this chamber and heated by means of the electrical resistance 25. It passes through the holes 12 into the second widening chamber B into which fuel is injected under pressure by the jet 35. The differences in the flow speeds, temperatures and pressures of the air and fuel ensure proper mixing thereof.

For a given operating injection pressure, the injector is regulated so as to ensure a measured delivery in the central portion for supplying the flame holder 30 which permits obtaining, in the wake of the latter, the richness of mixture most favourable for ignition. This wake moreover protects the bare resistance 27 from direct contact with the fuel, keeps it incandescent, assists in obtaining a more intimate mixture by preventing excess of fuel and, finally, prolongs the contact of the carburetted mixture with the resistance. For these various reasons satisfactory ignition is ensured.

The flame issues from the device through its opening directed at right angles to the direction of flow F and penetrates to the heart of the main combustion chamber of the jet engine into the wake of a burner. The mixture of primary air and operating fuel in this zone burns by reascent of the flame of the device towards the burner. Thence the combustion spreads to the entire combustion chamber of the jet engine.

It will be noted that the inlet 11 for air into the device is exposed to total pressure so as to take full advantage of the energy of the air flow while, on the other hand, the exit opening 38 for the flame is exposed only to static pressure so as to permit the flame to follow freely the local currents by which it is urged.

It will also be appreciated that the air and the carburetted mixture flow in opposite directions in the two chambers A and B. Moreover, by reason of the conical shape of the separating partition 7, the increasing cross-sections of these chambers in the direction of flow cause a deceleration of the latter and this assists ignition. Finally, the small wall thickness of the partition 7 permits efficient exchange of heat produced by the resistances.

The ignition device according to the invention has many advantages, such as:

Rapidity of ignition by rational use of the power consumed,

Non-carbonisation of the parts and in particular of the injector owing to the large exit cross-section, which permits free contact of the air on the inside and the easy evacuation of excess fuel, Low consumption of electricity due in particular to the efficient exchange of heat between the two chambers or enclosures, Absence of disturbance in the distribution of the temperatures at the inlet cross-section of the turbine owing to complete obscuration of the torch igniter at the periphery of the combustion chamber, Possibility of operation with a pilot flame by reason of the strength of the device due to its shape and its position in the combustion chamber, Facility of removal and interchangeability.

What is claimed is:

1. An igniter device designed to be located in the auxiliary combustion chamber of a jet engine, comprising a support, an outer annular shell attached to and extending forwardly from said support, a frusto-conical shell coaxially of and attached at its forward end to the forward end of the annular shell, said frusto-conical shell forming a central chamber and converging rearwardly to form with said annular shell an annular chamber between the shells, an air inlet to said annular chamber in the vicinity of the wider base of said frusto-conical shell, orifices in said frusto-conical shell in the vicinity of the narrower base of said shell, an outlet from said central chamber at the larger end thereof, an electrical heating resistance within said annular chamber and surrounding said frusto-conical shell, fuel injecting means mounted on said support, said fuel injecting means delivering fuel forwardly into said frusto-conical shell from said narrower base and inducing a flow of air through said orifices to mix with said fuel, and air-fuel mixture igniting means mounted forwardly of said injection means in said central chamber.

2. An igniter device as claimed in claim 1 wherein the electric resistance comprises a heating wire helically wound around the frusto-conical shell.

3. An igniter device as claimed in claim 1 wherein said frusto-conical shell is attached to said support at its rearward end.

References Cited by the Examiner

UNITED STATES PATENTS

| 1,689,667 | 10/28 | Free. | |
| 1,755,846 | 4/30 | Steed | 158—28 |
| 1,994,968 | 3/35 | Sloyan. | |
| 2,648,951 | 8/53 | McDougal | 60—39.82 |
| 2,760,340 | 8/56 | Seglem | 158—28 X |
| 2,852,069 | 9/58 | Ridel et al. | 158—28 |

FOREIGN PATENTS

| 406,291 | 2/34 | Great Britain. |

JAMES W. WESTHAVER, *Primary Examiner.*